July 12, 1927. 1,635,192
A. L. PREIMESBERGER
FRICTION CLUTCH PULLEY
Filed Oct. 17, 1924
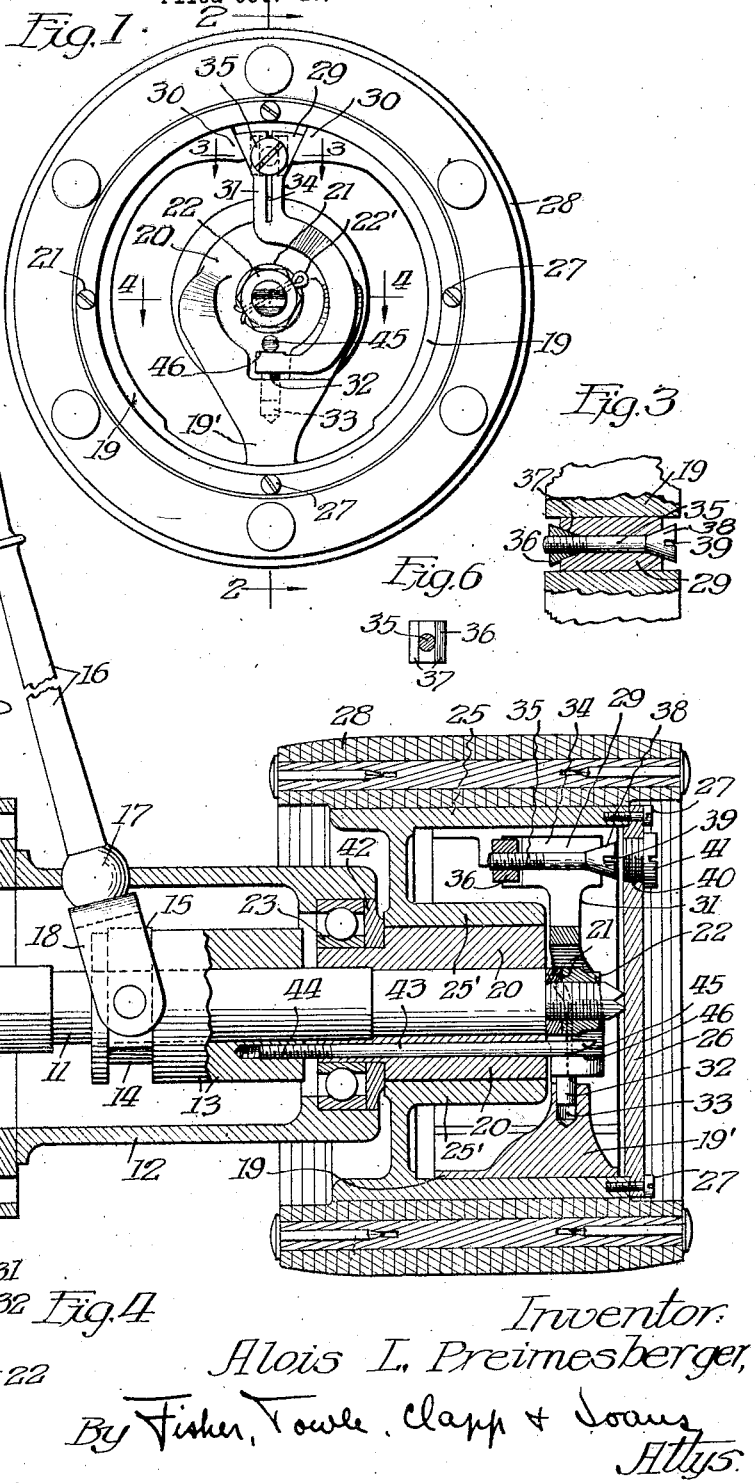
Inventor:
Alois L. Preimesberger,
By Fisher, Towle, Clapp & Soans
Attys.

Patented July 12, 1927.

1,635,192

UNITED STATES PATENT OFFICE.

ALOIS L. PREIMESBERGER, OF MENASHA, WISCONSIN, ASSIGNOR OF ONE-HALF TO FRANK E. SENSENBRENNER, OF MENASHA, WISCONSIN.

FRICTION-CLUTCH PULLEY.

Application filed October 17, 1924. Serial No. 744,220.

This invention relates to friction clutch pulleys, but more particularly such as are incorporated in tractor units, and has for its primary object to provide a simple, durable and efficient device of this character.

Further objects of the invention are to provide an improved device for spreading the friction ring, to provide improved means for actuating this spreading device, to protect the parts from dust, and in general to provide an improved clutch pulley.

The many other objects and advantages will be better understood by reference to the following specification when considered in connection with the accompanying drawing, illustrating a selected embodiment thereof, in which:—

Fig. 1 is an end elevation of a clutch pulley incorporating the principles of my invention.

Fig. 2 is a vertical section on the line 2—2 of Fig. 1.

Fig. 3 is a horizontal section on the line 3—3 of Fig. 1.

Fig. 4 is a horizontal section on the line 4—4 of Fig. 1.

Fig. 5 is a fragment of the section shown in Fig. 2, with the shaft broken away, and Fig. 6 is a detail view.

Referring to the drawing, the device comprises a driving gear 10, mounted on the end of the driven shaft 11, supported in the housing 12. A sleeve 13 is slidably mounted on this shaft and this sleeve is provided with a peripheral groove 14, in which travels a yoke 15. An operating lever 16 is fulcrumed intermediate its ends in the housing, as at 17, and the lower extremity is provided with a fork or spreading fingers as 18, which are pivotally connected to the yoke 15. This lever is adapted to move the sleeve 13 longitudinally of the shaft 11. A split ring 19, is provided with a hub 20, which is secured upon the shaft by a washer 21, nut 22, and cotter pin 22′ so that this ring will be driven by the shaft.

The outer ball bearing 23 for the shaft fits on the inner reduced portion or extension of this hub and acts between the same and the rear end portion of the housing 12. A similar bearing 24 acts between the hub of the gear 10 and the forward end of the housing. A pulley and clutch drum as 25, has its hub 25′ mounted upon the hub 20 of the split ring 19 and free to rotate thereon until the drum 25 is frictionally engaged by the ring 19 in the manner to be presently described. The ring proper is connected to its hub 20 by a web 19′ which in the present embodiment is integral therewith. A cover plate as 26, is preferably secured to the rear end of the clutch drum 25 by screws 27 or other suitable means to protect the parts particularly from dust. In the present embodiment a laminated pulley 28, of well known make has been secured upon the periphery of the clutch drum 25 to form the driving face thereof for operation of the rear end transmission of the tractor.

A substantially wedge shaped block as 29 fits between the inwardly converging ends 30, 30 of the split ring 19 to expand this ring and cause its periphery to frictionally engage the inner surface of the drum 25. An actuating arm 31 is provided on the block 29 and this arm encircles, extends or passes around and beneath the shaft 11. A pin 32 on the extremity of this arm loosely fits within a radial hole 33 drilled in the web 19′ of the hub 20. The wedge block 29 and adjoining portion of the arm 31 are split as at 34 to permit the expansion of the block for the purpose of adjustment. A bolt 35 projects through this split opening and the nut 36 thereon fits within an enlargement of such opening as at 37. The head 38 of this bolt is preferably conical and the nut is wedge shaped so that when the bolt is turned by inserting a screw driver in the slot 39 in the head, the wedge block is uniformly expanded. This adjustability of the wedge block is very advantageous as it permits increased expansion of the ring or compensation for wear. By expanding the block uniformly at both ends, the proper spreading of the ring and gripping of the drum 25 will be provided. In order to facilitate the adjustment of the block, I have provided an opening 40 in the cover plate opposite the head of the adjusting bolt and placed therein a threaded plug 41. An oil retainer 42 is preferably provided at the rear end of the housing.

An engaging rod 43 has its inner end 44 screwed into the end of the slidable sleeve 13 and this rod preferably projects through the entire hub 20 of the split ring 19 and inside the ball bearing 23. The outer end portion of this rod is bevelled as at 45 and the inclined face thereof coacts with the opposing face 46 of the arm 31 to force this end portion of the arm away from the axis of the shaft and to thereby draw the wedge block 29 inwardly, expanding the split ring and frictionally locking the pulley 25 on the shaft. The split ring possesses sufficient resiliency to permit this expansion and to cause the block to be forced outwardly as soon as the pressure on the face 46 is released. The ring is expanded when the parts are in the position illustrated in the drawing. To release the clutch the handle portion of the lever 16 is moved rearwardly, carrying the sleeve forwardly on the shaft and withdrawing the bevelled end of the rod 43 from engagement with the face 46 of the arm 31.

By passing through the hub of the split ring, and inside the ball bearing, the engaging rod is braced practically throughout its entire length, and no bending or yielding will occur. The location and mode of operation of this rod insures the greatest degree of permanency and efficiency. The operating parts are completely enclosed and this is a very desirable feature in a tractor. The wedge block is drawn radially inwardly to expand the ring instead of being pressed outwardly. The expansion fills the entire drum as distinguished from a small arc in the upper part thereof.

My clutch construction can be incorporated in the present standard Fordson tractor unit.

It will be obvious from the foregoing description that my invention is simple, compact and efficient. The parts are readily adjustable and the expansibility of the wedge block increases the life of the parts.

I am aware that the form and arrangement of parts may be considerably changed without departing from the spirit of my invention and I reserve the right to make all such variations as fairly fall within the scope of the following claims.

I claim as my invention:

1. In a friction clutch, the combination of a normally contracted divided ring having inwardly converging ends, a split wedge block disposed between said ends, an adjusting member in said block having tapered wedge members in both ends for uniformly expanding the same throughout its length, and means for moving said block substantially radially of said ring to expand said ring.

2. In a friction clutch, the combination of a divided resilient ring having converging ends, a split wedge block disposed between said ends and having an arm into which the split extends, an adjusting bolt fitting within the split in said block and having end wedges oppositely tapered and coacting with the walls thereof to uniformly expand said block, and means for actuating said block to expand said ring including the split arm forming a continuation of the block and means for shifting the arm radially.

3. In a friction clutch, the combination of a normally contracted resilient divided ring having converging ends, a split wedge block disposed between said ends, an adjusting bolt with oppositely disposed spreaders fitting longitudinally within the split in said block and coacting with the walls thereof at opposite ends of the block to uniformly expand said block, and means for actuating said block to expand said ring, said ring moving to contracted position when the last-named means is released.

4. In a friction clutch pulley, a housing, a hub, a bearing between the housing and hub, a driven shaft journaled in the housing and hub, a sleeve slidable on the shaft within the housing, a lever pivoted in the housing and operatively engaging the sleeve for sliding the same on the shaft, a split ring having inwardly converging ends, means for connecting the hub to the shaft for driving the hub, a web connecting the ring and hub, a clutch drum having a hub-bearing on the hub of the ring, a pulley on the clutch drum adapted for operative connection with the rear end transmission of a tractor or the like, a split wedge-shaped block between the ends of the ring and having an arm encircling the shaft and a pin guided radially in the web, a spreader in the split of the block for expanding the same, and a rod adjustably connected to the sleeve and extending through the hub first mentioned, within the bearing thereof, and having a beveled portion to engage the inner face of the arm to force the same away from the axis of the shaft and draw the wedge shaped block inwardly to spread the ring.

5. In a friction clutch, a revoluble shaft, a hub fixed on said shaft, a split ring carried by said hub, a wedge block fitting between the ends of said ring and adapted for inward movement to expand the ring, an arm projecting inwardly from said block and encircling said shaft, and a lever actuated operating member for said block extending through said hub and coacting with the inner extremity of said arm.

6. In a friction clutch, a revoluble shaft, a hub fixed on said shaft, a split ring carried by said hub, a wedge block fitting between the ends of said ring, an arm projecting inwardly from said block and partially encircling said shaft, and an operating member for said block slidably mounted in said hub and coacting with said arm on the opposite side of said shaft from said block to draw said block inwardly and thereby expand said ring.

7. In a friction clutch, a driven shaft, a hub fixed on said shaft, a bearing for said shaft fitting about said hub, a divided ring integral with said hub and encircling said shaft, means interposed between the ends of said ring for expanding the same, and means extending through said hub inside of said bearing for actuating said expanding means.

8. In a friction clutch, a revoluble shaft, a hub fixed on said shaft, a divided ring carried by said hub, a wedge block fitting between the ends of said ring and having an arm extending to the other side of the shaft, means to guide the arm, a bar slidable through said hub substantially parallel with said shaft to shift said arm to force the end thereof away from the axis of the shaft for operating said block to expand said ring, and means for manually actuating said bar.

9. In a friction clutch, a revoluble shaft, a drum free upon said shaft, a divided ring fixed upon said shaft and within said drum, a split wedge block for spreading said ring to cause driving connection between said shaft and said drum, a cover plate on the end of said drum having an opening opposite said block, and adjusting means for said block including a taper headed screw and a tapered nut mounted in the split, said screw being operable through said opening.

10. In a friction clutch, a revoluble shaft, a hub fixed on the shaft, a split ring carried by said hub and adapted to be expanded, a wedge block fitting between the ends of said ring and having an arm extending radially inwardly and then curved around the shaft to the opposite side, a bar slidable axially through an opening in said hub parallel with the shaft to force the end of the arm away from the axis of the shaft for drawing said block inwardly to expand said ring, and means mounted on the shaft to actuate the bar.

11. In a friction clutch, a revoluble shaft, a hub fixed on said shaft, a divided ring carried by said hub, a wedge block fitting between the ends of said ring, an arm projecting inwardly from said block, an operating bar for said block extending axially through said hub from end to end with a bearing substantially throughout its length and having a tapered end engaging the arm, and a lever having operative connection with the bar for sliding the latter to move the block radially inwardly for expanding the ring.

ALOIS L. PREIMESBERGER.